Feb. 15, 1949.  L. W. GERMANY  2,461,637
CIRCUIT ARRANGEMENT FOR PRODUCING A SINE WAVE
VOLTAGE FROM A PULSE WAVEFORM
Filed June 30, 1945

Inventor
LESLIE W. GERMANY
By
Cushman, Darby & Cushman
Attorneys

Patented Feb. 15, 1949

2,461,637

UNITED STATES PATENT OFFICE 2,461,637

CIRCUIT ARRANGEMENT FOR PRODUCING A SINE WAVE VOLTAGE FROM A PULSE WAVEFORM

Leslie W. Germany, Cambridge, England

Application June 30, 1945, Serial No. 602,599
In Great Britain April 3, 1944

Section 1, Public Law 690, August 8, 1946
Patent expires April 3, 1964

3 Claims. (Cl. 171—97)

A simple method of synchronising two rotating devices located remote from one another is to generate a sine wave voltage from one device and to use this voltage, after amplification if necessary, to drive the other device. When additional information has to be transmitted over the same channel, which may comprise a cable or a radio link, it is convenient to convert the sine wave voltage produced into a series of pulses, thus leaving space in the channel for the transmission of other intelligence, the pulses received at the remote station being re-converted back to a sine wave voltage or used to synchronise a sine wave voltage generator in order that the rotating device such as a phonic motor, at the remote station may be driven in synchronism with that at the transmitting station.

The present invention consists in an improved circuit arrangement for producing a sine wave voltage from a pulse waveform, which is particularly suitable in systems as above described and consists in converting the pulses to a saw tooth waveform, integrating the saw tooth waveform to remove the sharp flyback stroke of the saw tooth waveform, and converting the waveform thus produced to a sine wave by means of a tuned transformer circuit.

A preferred circuit arrangement according to the invention will now be described with reference to the accompanying drawings, in which.

Figure 1:
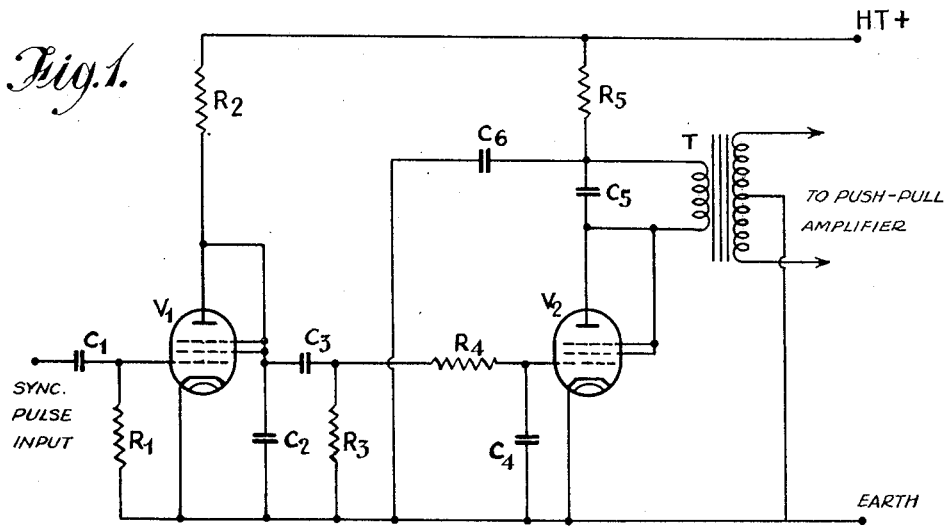
Fig. 1 shows the circuit arrangement.
Figure 2:
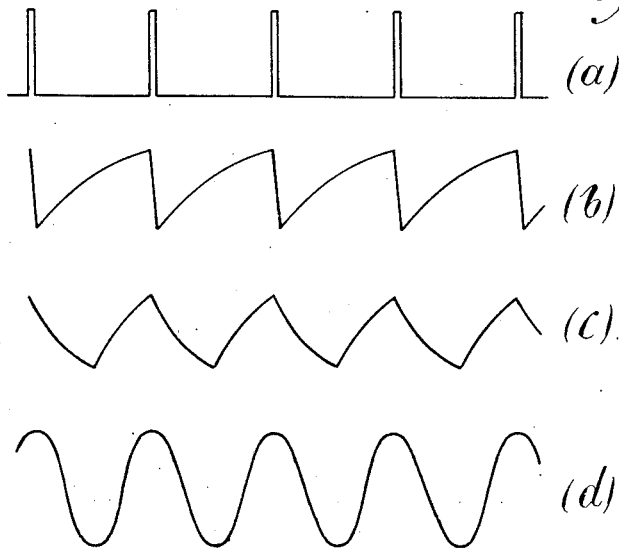
Fig. 2 shows in $a$, $b$, $c$ and $d$ the waveform at different parts of the circuit.

Referring to the drawing, the incoming pulses having the waveform shown in Fig. 2a are applied to the grid of the valve $V_1$ and serve to render it conducting to discharge condenser $C_2$, allowing a sawtooth waveform (Fig. 2b) to build up on the condenser in the periods between pulses. The condenser $C_2$ normally charges from the high tension supply through the resistance $R_2$ until a pulse is fed on to the grid of the valve $V_1$ via the condenser $C_1$. This causes the valve $V_1$ to conduct and thus discharge the condenser $C_2$ which latter, after the duration of the pulse, will commence to re-charge. The valve $V_1$ has no standing bias and, therefore, when pulses appear at the grid, grid current will flow causing a bias to be developed across the resistance $R_1$ which is applied to the grid, rendering the valve non-conducting between pulses.

The saw tooth waveform from the anode of the valve $V_1$ is fed through the coupling condenser $C_3$ and an integrating circuit comprising the resistance $R_4$ and the condenser $C_4$ to the grid of the valve $V_2$. The resistance $R_3$ is the grid leak of the valve $V_2$. The effect of the circuit $R_4$, $C_4$ is to remove the sharp flyback stroke of the saw tooth waveform and produce a waveform as shown in Fig. 2c. This waveform is amplified by the valve $V_2$ and converted to a sine wave (Fig. 2d) by the tuned transformer circuit comprising the transformer T and the condenser $C_5$. The resistance $R_5$ and the condenser $C_6$ serve to decouple the anode circuit of $V_2$ from the high tension line. The secondary of the transformer T may be centre tapped to provide a phase split output to drive push-pull amplifiers which, in turn, drive the phonic motor. The tuned transformer circuit is not made very selective and allows for a reasonable drift in the frequency of the incoming pulses.

I claim:

1. Circuit arrangement for producing a sine wave voltage from a pulse waveform, comprising means for converting the pulses to produce a saw tooth waveform, means for integrating the saw tooth waveform to remove the sharp flyback stroke thereof, and a tuned transformer circuit to which the integrated saw tooth waveform is fed for converting it to a sine wave.

2. Arrangement for producing a sine wave voltage from a pulse waveform comprising an electronic valve to the control electrode of which the pulse waveform is fed, a charging circuit comprising a resistance in the anode circuit of the valve and a condenser shunted thereacross, the output from said valve and charging circuit being fed through an integrating circuit to the control electrode of a second electronic valve, and a tuned transformer fed by the output of said second valve.

3. Arrangement as claimed in claim 2, wherein the integrating circuit comprises a resistance in series with the control electrode of said second electronic valve and a condenser shunted between said control electrode and the cathode of said second electronic valve.

LESLIE W. GERMANY.

No references cited.